United States Patent

Davies

[15] 3,661,238

[45] May 9, 1972

[54] HEAT DISSIPATING MEANS FOR USE WITH FRICTION CLUTCHES OF MOTOR VEHICLES

[72] Inventor: David A. Davies, Leamington Spa, England

[73] Assignee: Automotive Products Company, Limited, Leamington Spa, Warwickshire, England

[22] Filed: Oct. 30, 1969

[21] Appl. No.: 873,770

[30] Foreign Application Priority Data

Oct. 30, 1968 Great Britain.....................51,474/68

[52] U.S. Cl...................192/113 A, 192/70.12, 188/264 AA
[51] Int. Cl.......................................................F16d 13/72
[58] Field of Search......................192/113.1, 70.12; 165/44; 188/71.6, 264 A, 264 AA

[56] References Cited

UNITED STATES PATENTS 2,198,792  5/1942  Schjolin..............................192/113 A
3,437,183  5/1969  Maurice..............................192/113 B

*Primary Examiner*—Mark M. Newman
*Assistant Examiner*—Randall Heald
*Attorney*—L. J. Winter

[57] ABSTRACT

A motor vehicle (10) has a friction clutch (18) housed within a chamber defined in part by a bell housing (13). A hollow casing (24) is mounted below the bell housing (13) with its interior in communication with the interior of the bell housing (13) through two conduits (25 and 28) which each terminate in a corresponding one of two ports (26 and 27) which are spaced apart axially of the bell housing (13). In operation of the motor vehicle (10) air heated by operation of the clutch (18) flows from the high pressure region (22) at the radial periphery of the clutch (18) through the hollow casing (24) to the low pressure region (23) at the other end of the bell housing (13) and is cooled by heat exchange within the hollow casing with the relative air stream caused by movement of the vehicle (10).

6 Claims, 6 Drawing Figures

INVENTOR
David A. Davies
BY Lawrence J. Winter
ATTORNEY

PATENTED MAY 9 1972

INVENTOR
David A. Davies
BY Lawrence J. Winter
ATTORNEY

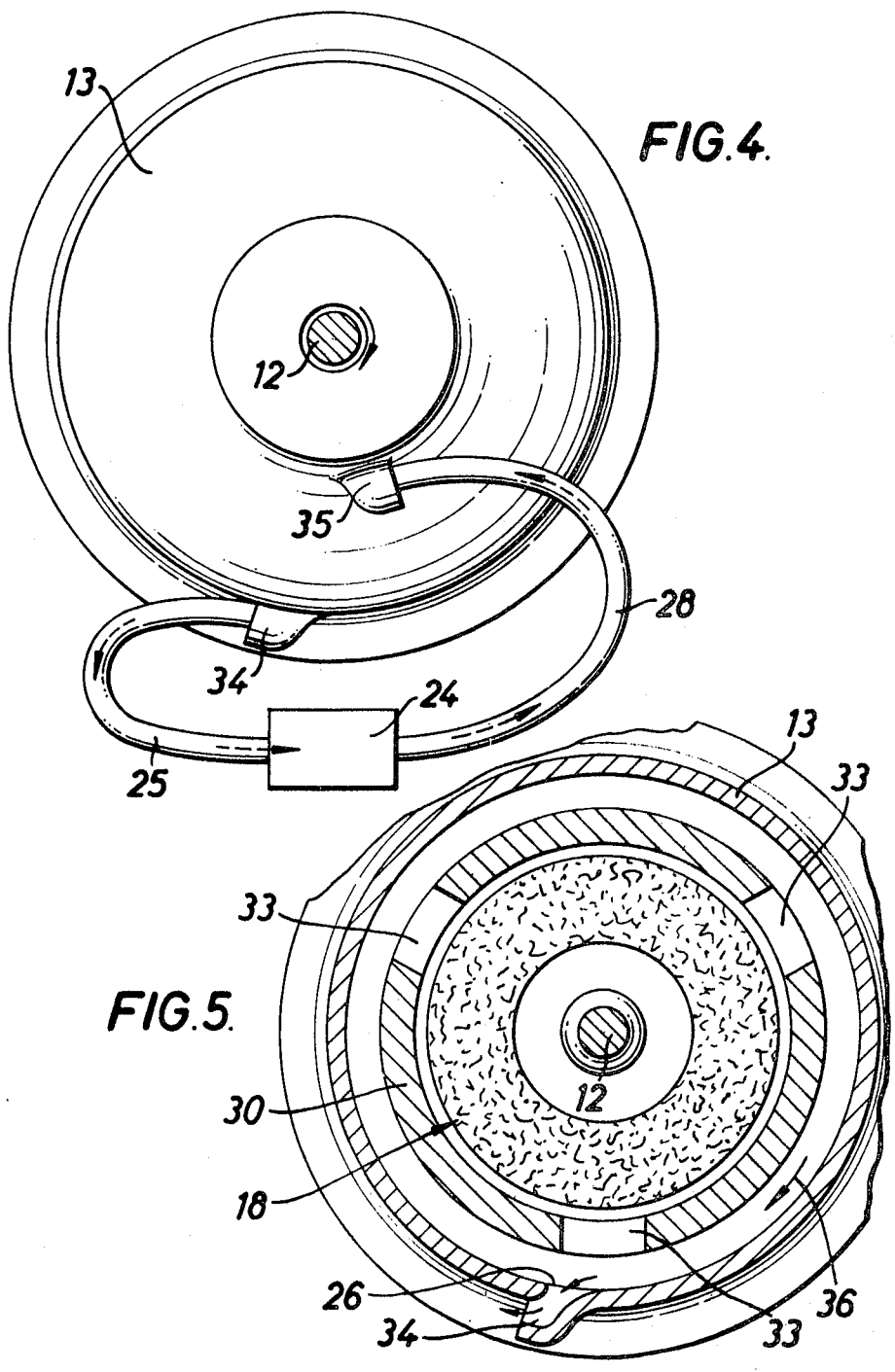

HEAT DISSIPATING MEANS FOR USE WITH FRICTION CLUTCHES OF MOTOR VEHICLES

This invention relates to heat dissipating means for use with friction clutches of motor vehicles, and to motor vehicles including such heat dissipating means.

The object of this invention is to provide for the more effective dissipation of heat than is provided by conventional arrangements.

Generally friction clutches for motor vehicles comprise a flywheel against a driven surface of which a driven plate is clamped by spring pressure acting on a pressure plate, the driven plate and pressure plate being enclosed usually, but not necessarily, within a cover plate rotating with the flywheel. Usually the clutch is housed in a stationary casing, commonly called a bell housing, which contains a fluid (such as air) within which the clutch operates. The rotation of the clutch tends to create a centrifugal flow of fluid from the immediate vicinity of the clutch plates, so that heat generated during slipping of the clutch is carried by centrifugal fluid flow towards the walls of the bell housing. If the clutch plates are surrounded by a peripheral wall on the flywheel or cover plate, openings are provided in the peripheral wall to allow the outward flow of fluid.

Generally heat dissipation from the bell housing is dependent on conduction through the housing walls, but such dissipation is relatively slow and, if clutch slip continues for any considerable length of time, the temperature of all the fluid contained within the bell housing may reach a value not appreciably less than that in the immediate vicinity of the clutch plates, so that the temperature of the clutch plates remains at an undesirably high value.

It has been found that, although heat dissipation from the bell housing can be improved by providing fins on its external surface, the improvement is not substantial. Furthermore, where the fluid is air, it has been proposed also to provide openings in the bell housing to allow the escape of hot air therefrom, the openings being covered by perforate or mesh material, but this is undesirable since fine dust and other foreign matter cannot be prevented from entering into the interior of the bell housing through the openings.

According to one aspect of this invention there is provided heat dissipating means for use with friction clutches of motor vehicles, the heat dissipating means including a bell housing having an internal surface which defines part of a boundary of a chamber in which a friction clutch is housed during use of the heat dissipating means, wherein the bell housing is provided with two ports which open into the internal surface and which are located so that one of said ports is nearer to the radial periphery of a friction clutch housing within the chamber defined in part by the bell housing than is the other said port during use of the heat dissipating means, and wherein heat exchange means are mounted so as to be located outside the chamber defined in part by the bell housing, the heat exchange means including conduit means interconnecting the two ports and arranged to bring fluid flowing therethrough into a heat exchange relationship with a cooling medium, the arrangement being such that during operation of a friction clutch housing within the chamber defined in part by the bell housing, fluid heated by operation of the friction clutch flows from said one port to said other port through said conduit means and is cooled by being brought into heat exchange contact with the cooling medium.

It has been found that the centrifugal flow of fluid induced by the rotation of the clutch creates a zone of relatively high pressure in the immediate vicinity of the clutch periphery whereas the pressure of fluid at other parts of the interior of the bell housing remains at a low value, and this pressure difference is used to produce flow of fluid through said conduit means.

Preferably the fluid is air. The heat exchange means may include a hollow casing, the interior of which is in communication with said ports through said conduit means. The hollow casing may be provided with external fins. Conveniently the two ports are spaced apart axially of the bell housing, in which case baffle means may be provided within the bell housing between the two ports.

According to another aspect of this invention a motor vehicle includes a friction clutch housed within a chamber defined in part by the internal surface of a bell housing, and means for dissipating heat produced during operation of the friction clutch, the heat dissipating means including two ports formed in the bell housing and opening into the internal surface thereof, one of the ports being located nearer to the radial periphery of the friction clutch than is the other, and heat exchange means mounted outside said chamber, the heat exchange means including conduit means interconnecting the two ports and arranged to bring fluid flowing therethrough into a heat exchange relationship with a cooling medium, the arrangement being such that during operation of the friction clutch, fluid heated by heat produced during operation of the friction clutch flows from said one port to said other port through said conduit means and is cooled by being brought into heat exchange relationship with the cooling medium.

The heat exchange means may be mounted so as to be exposed in the relative air stream created by movement of the vehicle, the air stream serving as the cooling medium, and preferably the heat exchange means may be so mounted below the bell housing.

Conveniently the end of said conduit means opening into said one port is inclined or curved outwardly from the interior of the bell housing in the direction of rotation of the friction clutch so that the tangential components of fluid flow induced during operation of the friction clutch in the region of the radial periphery of the friction clutch assists in creating fluid flow through the conduit means of the heat exchange means. Furthermore the end of the conduit means opening into the other port may be curved or inclined inwardly into the interior of the bell housing in the direction opposite to the direction of rotation of the friction clutch so that the tangential components of fluid flow created in the region of the radial periphery of the friction clutch during operation of the friction clutch assists in the fluid flow through the conduit means and the return of such fluid into the bell housing through said other port.

Two arrangements of heat dissipating means according to this invention will now be described by way of example only with reference to the accompanying drawings, of which:

FIG. 4 is a view on arrow A of the clutch bell housing of FIG. 3.

FIG. 5 is a section on the line V—V of FIG. 3; and

Figure 1:
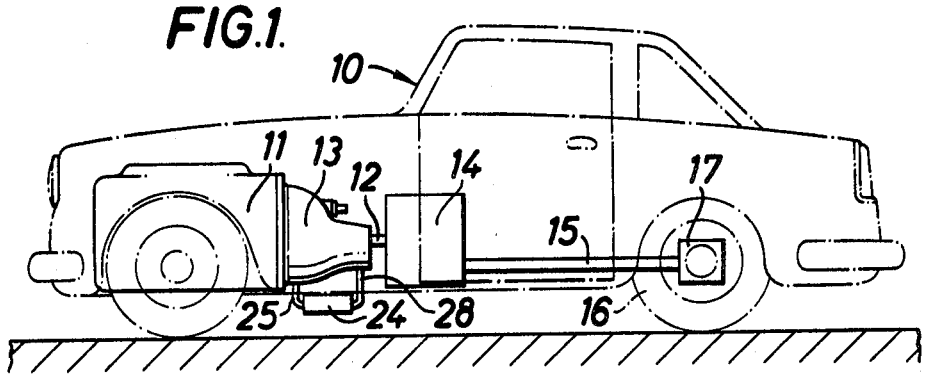
FIG. 1 illustrates diagrammatically a motor vehicle incorporating heat dissipating means in accordance with this invention.

Referring to FIG. 1 a motor vehicle 10 has an internal combustion engine 11, the crankshaft (not shown) of which is coupled to a driven shaft 12 by a clutch enclosed within a bell housing 13 secured at its larger end to the body of the engine 11. The driven shaft 12 extends into a gear box 14 and the output shaft 15 of the gear box drives a pair of road wheels 16 of the vehicle 10 through a differential gearing 17.

Figure 2:
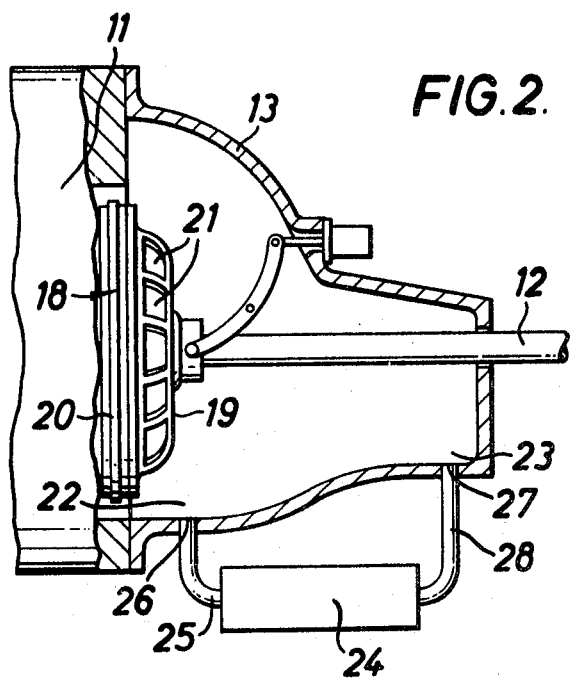
FIG. 2 is a longitudinal section through a clutch bell housing showing one arrangement of heat dissipating means according to this invention.
Figure 3:
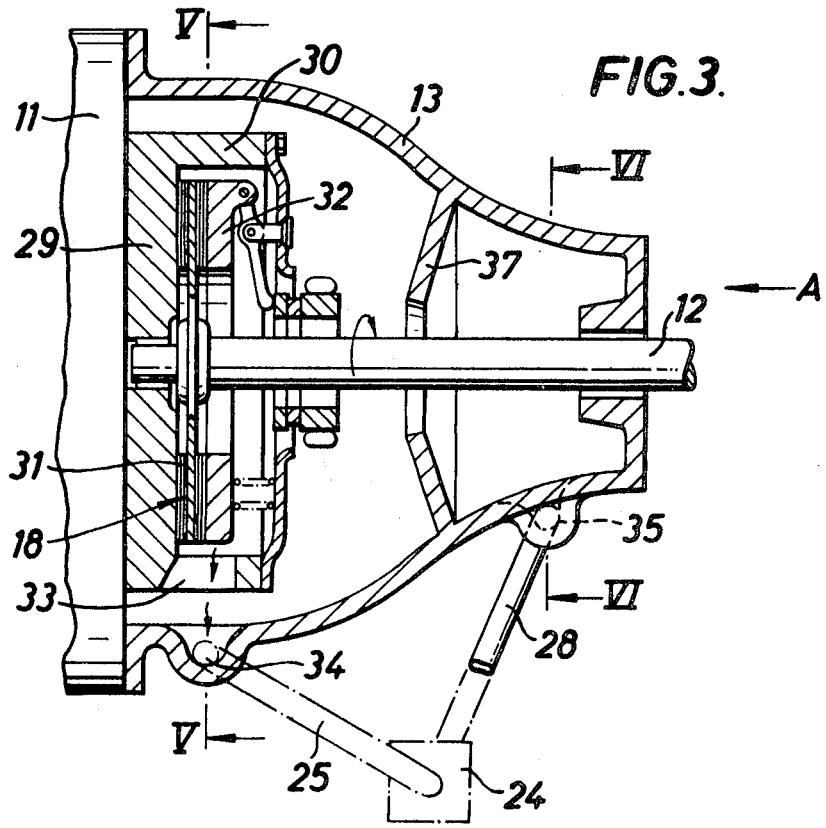
FIG. 3 is a longitudinal section similar to that of FIG. 2 through a clutch bell housing showing a second arrangement of heat dissipating means according to this invention.
Figure 6:
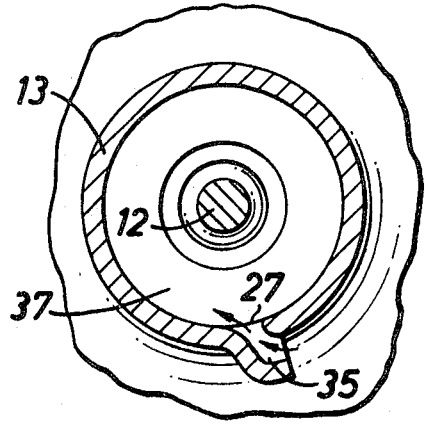
FIG. 6 is a section on the line VI—VI of FIG. 3.

FIG. 2 shows that the clutch 18 includes a cover plate 19 fixed to the flywheel 20 of the engine 11. The cover plate 19 is formed with peripheral openings 21 through which air from the interior of the clutch 18 tends to be thrown radially outwardly by centrifugal force when the clutch 18 is rotating, the flow of air having a tangential component owing to the rotation of the clutch 18. The flow of air under centrifugal force tends to create a zone of relatively high pressure at 22 around the radial periphery of the clutch 18, whereas the air pressure in the part 23 of the chamber defined by the internal surface of the bell housing 13 and the engine 11, which part 23 is spaced axially from the clutch 18 and which surrounds the driven shaft 12, remains at a lower pressure.

A hollow casing 24, external to the bell housing 13, is connected to the relatively high pressure zone 22 by a conduit 25 which opens into the one of two axially spaced ports 26 and 27 which is nearer to the high pressure zone 22 and thus nearer to the radial periphery of the clutch 18. The hollow casing 24 is connected also to the relatively low pressure part 23 by a conduit 28 through the other port 27. It will be evident that, due to the difference in pressure between the high pressure zone 22 and the low pressure part 23, air will tend to flow through the port 26, the conduit 25, the casing 24, the conduit 28 and the port 27. The casing 24 is positioned below the bell housing 13 (see FIG. 1) so that the casing 24 is exposed in the relative air stream created by movement of the vehicle 10. Thus the casing 24 acts as a heat exchanger to extract heat from the air flowing through it. The casing 24 may be provided with external fins to increase its heat dissipation area, and may be made of material having good conducting properties.

In the arrangement shown in FIGS. 3 to 6, parts similar to corresponding parts of the arrangement of FIG. 2 have been given the same reference numerals. The clutch 18 is associated with an engine flywheel 29 of the internal combustion engine 11, the flywheel 29 having a peripheral wall 30 which surrounds a driven plate 31 and a pressure plate 32 of the clutch 18, the peripheral wall 30 having openings 33 through which air from the interior of the clutch 18 tends to be thrown outwardly by centrifugal force. As already described the air flow has a tangential component due to the rotation of the clutch.

The one port 26 of the bell housing 13 of the arrangement of FIGS. 3 to 6 is defined by an outlet alcove 34 positioned generally in the cross sectional plane containing the openings 33, and the other port 27 is defined by an inlet alcove 35 which is spaced axially and circumferentially from the outlet alcove 34 (see FIG. 4). As in the arrangement of FIG. 1 a hollow casing 24, serving as a heat exchanger, is connected between the two ports 26 and 27 by conduits 25 and 28 which are connected respectively to the alcoves 34 and 35. The outlet alcove 34, as shown in FIG. 4, is inclined or curved outwardly in the direction of rotation of the clutch 18, indicated by the arrow 36, so that the tangential component of air flow assists in creating air flow through the casing 24. The inlet alcove 35 is inclined or curved similarly in the opposite direction (see FIG. 6).

A baffle 37 is provided in the bell housing 13 between the two ports 26 and 27 so as to reduce internal circulation of air within the chamber defined by the bell housing 13 and the engine 11 and to ensure that a substantial portion of the air circulates through the heat exchange means defined by the conduits 25 and 28 and the hollow casing 24.

Various modifications or refinements of the two arrangements described above with reference to the accompanying drawings may be incorporated without departing from the scope of this invention. For example the chamber defined by the bell housing and the engine may be filled with any other suitable fluid if a suitable seal is provided between the casing and the driven shaft, so that the clutch will operate within such other suitable fluid instead of within air as described above, the fluid being heated by operation of the clutch and fluid so heated being passed through the heat exchange means located outside the chamber to be cooled therein. The casing which affords the heat exchanger of the heat exchange means may be positioned in any other position relative to the bell housing so as to be exposed to the relative air stream created by movement of the vehicle, or so as to bring fluid heated by operation of the friction clutch into heat exchange relationship with any other suitable cooling medium.

I claim:

1. Heat dissipating means for use with friction clutches of motor vehicles, comprising a bell housing having an internal surface defining part of a boundary of a chamber, a friction clutch disposed in said housing, port means in said bell housing comprising two ports opening into said internal surface and positioned therein so one port is nearer to the radial periphery of said friction clutch housed therein than the other port during use of the heat dissipating means; heat exchange means disposed outside said housing including conduit means interconnecting said two ports and disposed to bring fluid flowing therethrough into a heat exchange relationship with a cooling medium; the arrangement being such that fluid heated by operation of said friction clutch housed therein flows from said one port to said other port through said conduit means and is cooled by being brought into heat exchange relationship with the cooling medium, said clutch including a shaft extending from the housing, and baffle means disposed within said housing between said ports and having central opening means therein forming an air passage, and said shaft extending therethrough.

2. Heat dissipating means for use with friction clutches of motor vehicles comprising an elongated bell housing having a front portion and rear portion with an internal surface defining the boundary of a chamber, a friction clutch disposed in said housing having a radially outwardly extending periphery, a first port means disposed in the front portion of said housing and in juxtaposition with the edge portion of said outwardly extending periphery, another port means disposed in the rear portion of said housing, heat exchange means disposed outside said housing including conduit means interconnecting said two port means and disposed to permit the natural circulation of fluid from said one port means to said another port means to dissipate heat generated by said clutch, including a shaft extending through the housing, baffle means disposed within the housing between said ports, said baffle means having central opening means therein forming an air passage, and said shaft extending therethrough.

3. Heat dissipating means for use with friction clutches of motor vehicles, comprising a ball housing having an internal surface defining part of a boundary of a chamber, a friction clutch disposed in said housing and including a peripheral wall enclosing the interior of said clutch, openings in said peripheral wall for the passage of air expelled by centrifugal force from the interior of the clutch, port means in said bell housing comprising two ports opening into said internal surface and positioned therein so one port is in the region of the bell housing into which air is expelled through said openings and the other port is remote from said region during use of the heat dissipating means; heat exchange means disposed outside said housing including conduit means interconnecting said two ports and disposed to bring fluid flowing therethrough into a heat exchange relationship with a cooling medium; the arrangement being such that fluid heated by operation of said friction clutch housed therein flows from said one port to said other port through said conduit means and is cooled by being brought into heat exchange relationship with the cooling medium.

4. Heat dissipating means of claim 1 wherein said fluid is air.

5. Heat dissipating means of claim 1 wherein said heat exchange means includes a hollow casing with its interior being in communication with said ports through said conduit means.

6. Heat dissipating means of claim 1 wherein the improvement further comprises said two ports being spaced apart axially of said bell housing.

* * * * *